United States Patent
Benisty et al.

(10) Patent No.: US 10,949,256 B2
(45) Date of Patent: Mar. 16, 2021

(54) THREAD-AWARE CONTROLLER (71) Applicant: Western Digital Technologies, Inc., San Jose, CA (US)

(72) Inventors: Shay Benisty, Beer Sheva (IL); Leonid Minz, Beer Sheva (IL); Tal Sharifie, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 163 days.

(21) Appl. No.: 16/268,960

(22) Filed: Feb. 6, 2019

(65) Prior Publication Data
US 2020/0249989 A1 Aug. 6, 2020

(51) Int. Cl.
G06F 9/48 (2006.01)
G06F 9/30 (2018.01)
G06F 9/38 (2018.01)

(52) U.S. Cl.
CPC .......... G06F 9/4881 (2013.01); G06F 9/3009 (2013.01); G06F 9/3877 (2013.01)

(58) Field of Classification Search
CPC ..... G06F 9/4881; G06F 9/3009; G06F 9/3877
See application file for complete search history.

(56) References Cited

U.S. PATENT DOCUMENTS

| 9,223,709 B1 | 12/2015 | O'Bleness et al. | |
| 2009/0138683 A1* | 5/2009 | Capps, Jr. | G06F 9/5011 |
| | | | 712/220 |
| 2017/0147233 A1* | 5/2017 | De | G06F 3/0685 |

OTHER PUBLICATIONS

Excerpt from "ARM Cortex-R52 Processor Technical Reference Manual Revision r1p0"; Arm Limited; available at https://developer.arm.com/docs/100026/0100/system-control/aarch32-register-descriptions/hyp-software-thread-id-register; Mar. 30, 2017.

* cited by examiner

Primary Examiner — Jacob D Dascomb
(74) Attorney, Agent, or Firm — Barry IP Law, P.C.

(57) ABSTRACT

A controller includes one or more hardware components for performing operations, an interconnect, and a plurality of processors connected to the one or more hardware components through the interconnect. Each processor of the plurality of processors is configured to perform multithreading to concurrently handle multiple threads of execution, and assign a different thread identifier or master ID value to each concurrently handled thread of execution. An instruction is generated for a hardware component by executing a thread of the concurrently handled threads of execution. The instruction includes the thread identifier or indicates the master ID value assigned to the thread. The generated instruction is sent to the hardware component through the interconnect.

18 Claims, 5 Drawing Sheets

THREAD-AWARE CONTROLLER

BACKGROUND

A thread of execution is the smallest sequence of programmed instructions that can be managed independently by a scheduler, which is usually part of an operating system. In most cases, a thread is a component of a process. Multiple threads can exist within one process, executing concurrently and sharing resources such as memory, while different processes do not share such resources. In particular, the threads of a process can share executable code and the values of variables at any given time. However, only one thread can be processed by a processor at any given time.

Multithreading is mostly found in multitasking operating systems, such as in data storage devices. Multithreading is a programming and execution model that allows multiple threads to exist within the context of one process. Theses threads share the resources of the process, but are able to execute independently. The threaded programming model provides developers with a useful abstraction of concurrent execution. Multithreading can also be applied to one process to enable parallel execution on a multiprocessing system.

In data storage devices, for example, each processor of a controller can implement several threads that share resources, such as a logical-to-physical translation layer, low level drivers, front-end related tasks for communication with a host, an exception handler, and an interrupt routine. Hardware components of the controller receive instructions from the processor or processors. In some cases, the instructions may include information identifying the processor that sent the instruction, which can be used for routing a result of performing the instruction back to the processor or an indication that the instruction has been completed.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Environment Examples

Figure 1:
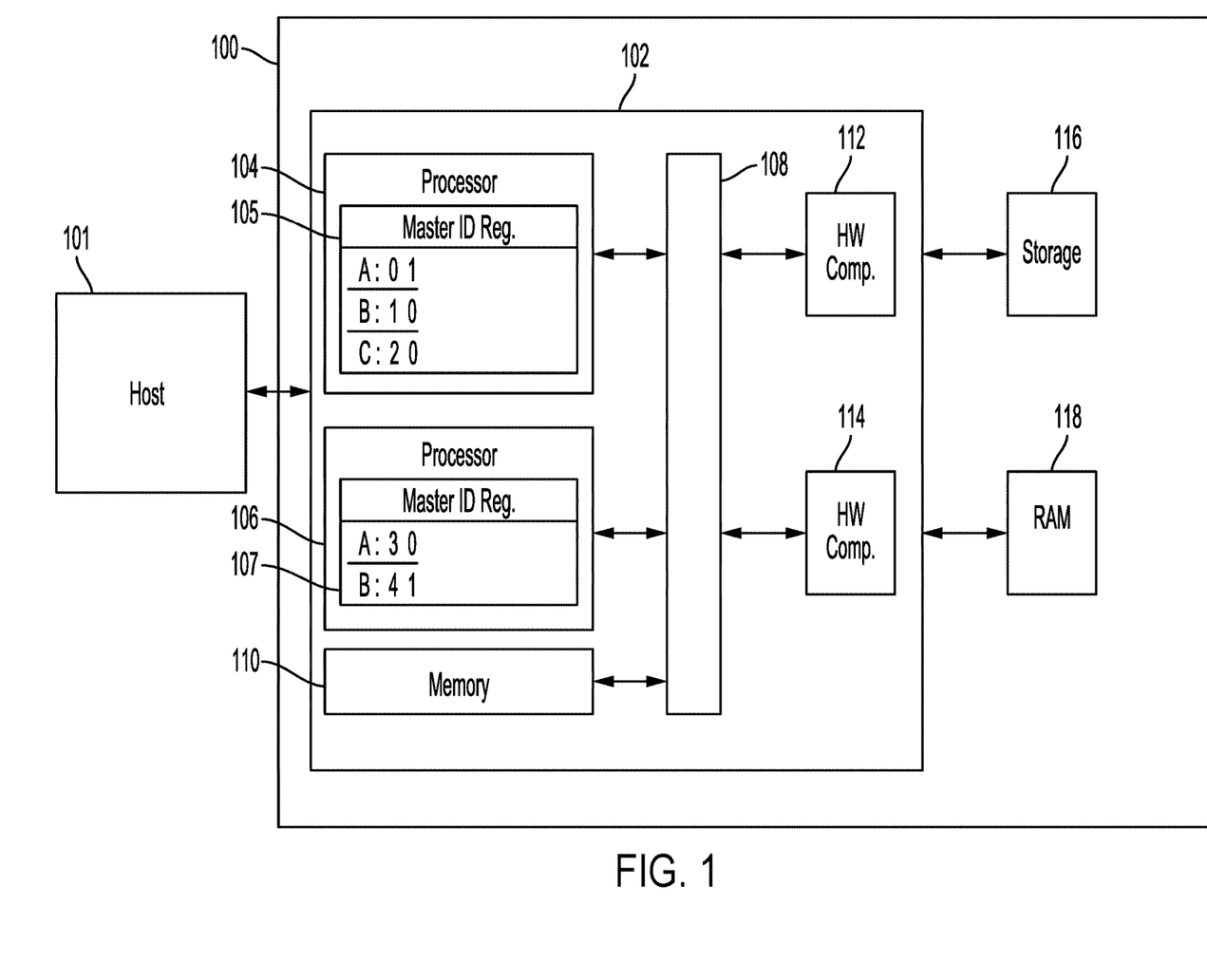
FIG. 1 is a block diagram of a controller according to an embodiment.

FIG. 1 is a block diagram of controller 102 in Data Storage Device (DSD) 100 according to an embodiment. As shown in FIG. 1, controller 102 communicates with host 101, storage 116, and Random Access Memory (RAM) 118. In the example of FIG. 1, storage 116, RAM 118, and controller 102 are housed together in DSD 100, with controller 102 serving as a controller for controlling operation of DSD 100. Although DSD 100 is used in the example of FIG. 1, those of ordinary skill in the art will appreciate that the thread-aware controller and methods of the present disclosure can be used in other types of electronic devices.

DSD 100 includes storage 116 for non-volatilely storing data. For example, DSD 100 can include one or more solid-state memories for storage 116, so that DSD 100 is considered a Solid-State Drive (SSD) or a memory card, such as a Secure Digital (SD) memory card. In other examples, DSD 100 can include one or more rotating magnetic disks for storage 116, so that DSD 100 is considered a Hard Disk Drive (HDD). In yet other examples, DSD 100 can include a combination of storage media types for storage 116, such as where DSD 100 is a Solid-State Hybrid Drive (SSHD) that includes a rotating magnetic disk and a solid-state memory for storage 116.

While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., Single-Level Cell (SLC) memory, Multi-Level Cell (MLC) memory (i.e., two or more levels), or any combination thereof), NOR memory, EEPROM, Ferroelectric Memory (FeRAM), Magnetoresistive RAM (MRAM), other discrete NVM chips, or any combination thereof.

Host 101 communicates with DSD 100 to retrieve data from and store data in DSD 100. In the example embodiment of FIG. 1, host 101 is separate from DSD 100, and may include, for example, a server or other computer system. In other embodiments, host 101 may be housed together with DSD 100 as part of a single electronic device, such as, for example, a desktop, laptop or notebook computer or another type of electronic device such as a tablet, smartphone, network media player, portable media player, or Digital Video Recorder (DVR). As used herein, a host can refer to a device that is capable of issuing commands to DSD 100 to store data or retrieve data. In this regard, host 101 may include another DSD such as a smart DSD that is capable of executing applications and communicating with other DSDs.

As shown in FIG. 1, DSD 100 includes RAM 118, which can include, for example, a volatile RAM such as Dynamic RAM (DRAM), a non-volatile RAM, or other solid-state memory. RAM 118 can be used by controller 102 to store data used by controller 102. Data stored in RAM 118 can include data read from storage 116, data to be stored in storage 116, instructions loaded from a firmware of DSD 100 for execution by controller 102, and/or data used in executing a firmware for DSD 100.

In the example of FIG. 1, controller 102 includes processor 104, processor 106, memory 110, interconnect 108, hardware (HW) component 112, and HW component 114. Processors 104 and 106 can execute instructions, such as instructions from an operating system, firmware, or application of DSD 100. Processors 104 and 106 can include circuitry such as a microcontroller, a Digital Signal Processor (DSP), an Application-Specific Integrated Circuit (ASIC), a Field Programmable Gate Array (FPGA), hard-wired logic, analog circuitry and/or a combination thereof. In some implementations, processors 104 and/or 106 can include a System on a Chip (SoC), which may be combined with memory 110. In some implementations, processors 104 and 106 can include Reduced Instruction Set Computer (RISC) processors, such as a RISC-V or ARM processor. In other implementations, processors 104 and 106 can include a different type of processor, such as a Complex Instruction Set Computer (CISC) processor.

Interconnect 108 connects processors 104 and 106 with memory 110 and with HW components 112 and 114. In some implementations, interconnect 108 can include, for example, a bus.

HW components 112 and 114 can include components for performing operations of controller 102. Such components can include, for example, a memory controller for controlling operation of RAM 118, a storage controller for controlling operation of storage 116, an error correction unit for correcting data read from storage 116 or another memory, and an interface for controlling communication with host 101. HW components 112 and 114 can include hardware and software resources, such as registers, ports, processing units, memory units, and modules that perform functions of the HW component. As discussed in more detail below with reference to FIG. 2, the use of such resources may be shared or arbitrated by the HW component among different threads to improve system performance by allowing concurrent access to the HW component by different threads without having to entirely duplicate the HW block.

As shown in the example of FIG. 1, processor 104 and processor 106 include master ID register 105 and master ID register 107, respectively. As discussed in more detail below, master ID registers 105 and 107 are local registers of their respective processors for storing master ID values or thread identifiers that have been assigned to threads being handled by processor 104 or processor 106. Unlike conventional processors and controllers that may use a master ID value or other identifier for a processor, the present disclosure provides for unique master ID values or thread identifiers to identify particular threads or categories of threads (e.g., the type of process associated with the thread) being handled by one or more processors. As discussed in more detail below, this can allow HW components to be aware of the thread or type of thread that generated an instruction sent to the HW component.

In some implementations, the concurrently handled threads of execution for DSD 100 in FIG. 1 can be threads of a firmware for controlling operation of DSD 100. The firmware may be stored, for example, in memory 110 for execution by processors 104 and 106.

As discussed above, a thread can be a subset of instructions, such as a subset of a process. Processors 104 and 106 in FIG. 1 are multithreading processors in that processors 104 and 106 are configured to concurrently handle multiple threads of execution to share resources of the processor, such as cache levels or accesses of memory 110 to allow the concurrently handled threads to share executable code or variables. However, only one thread can actually be processed by each processor at a particular time. The processors of the present disclosure use thread identifiers or master ID values to indicate or identify a thread that generated an instruction sent to a HW component, such as to HW components 112 or 114 via interconnect 108.

By indicating or identifying particular threads, it is ordinarily possible for HW components of controller 102 (e.g., HW components 112 and 114) to make decisions based on the thread that generated an instruction to be performed by the HW component. For example, HW component 114 may be a sub-controller (e.g., a DRAM controller) for controlling operation of RAM 118. HW component 114 may then use thread identifiers or master ID values indicated by instructions received from processors 104 and 106 to allocate space in a cache of HW component 114 for data to be accessed in RAM 118. In some cases, portions of the cache may be equally allocated among threads to prevent one of the threads from using too much of the cache to the exclusion of other threads. In other cases, portions of the cache may be allocated in particular ratios based on the thread (e.g., 70% to thread A indicated by master ID value 0 in FIG. 1 and 30% to thread B indicated by master ID value 4 in FIG. 1).

In other examples, the thread identifier or master ID value for a thread may be used by a HW component of controller 102 to partially or completely lock access or prevent certain threads from accessing the HW component. For example, a Flash Translation Layer (FTL) thread for performing address indirection in storage 116 should not have access to a Front-End (FE) HW component (e.g., HW component 112). The HW component may then block access to firmware threads that are identified as being an FTL thread using a master ID value or thread identifier associated with FTL threads.

Another example is the clearance of interrupt events. This is usually only done by threads of an interrupt routine, and not by other firmware threads. A HW component may only allow an interrupt routine thread to access registers for clearing interrupt events using a master ID value or thread identifier that is associated with an interrupt routine. The identification of threads can ordinarily improve the security and stability of controller 102 by preventing unauthorized threads or unauthorized categories of threads from accessing HW components. In some implementations, a HW block can provide full access for a first thread or first category of thread (e.g., allowing both read and write access), provide partial access to a second thread or second category of thread (e.g., allowing only read access or only write access), and allow no access (e.g., preventing read and write access) to a third thread or third category of thread.

In addition, the identification of threads using a master ID value or other thread identifier can allow for virtualization of a resource of the HW component. As discussed in more detail below with reference to FIG. 2, a resource of one HW component, such as a set of registers or a module of the HW component, may be shared and/or arbitrated among different threads, instead of requiring each thread to use a different set of registers or a different module at a different HW component or wait until a first thread completes its instruction at the HW component.

The identification of threads by HW components of controller 102 can also allow for different levels of Quality of Service (QoS) or prioritization for different threads or categories of threads. For example, a HW component may prioritize performance of a later received instruction generated by a first thread for a random read command from host 101 over the performance of an earlier received instruction generated by a second thread for exception handling based on the master ID values or thread identifiers associated with the threads. Such prioritization can ordinarily allow for a specified QoS to be achieved for certain types of instructions or commands from host 101.

In the example of FIG. 1, processor 104 is configured to concurrently handle up to three threads A, B, and C. Local master ID register 105 of processor 104 includes unique thread identifiers or master ID values 0, 1, and 2 for the three threads that processor 104 is capable of concurrently handling. On the other hand, processor 106 is configured to concurrently handle up to two threads, A and B. Local master ID register 107 of processor 106 includes unique thread identifiers or master ID values 3 and 4 for the two threads that processor 106 is capable of concurrently handling. In addition, master ID registers 105 and 107 each include an indication of the thread that is currently being executed by processors 104 and 106, respectively, with a value of "1" for thread A in the second column of master ID register 105, and a value of "1" for thread B in the second column of master ID register 107.

Those of ordinary skill in the art will appreciate that other implementations of DSD 100 in FIG. 1 can include a different arrangement of components, modules, or data structures. For example, other implementations can include a different number of HW components or processors. As another example, master ID registers 105 and 107 may be stored in a different location, such as in memory 110, rather than in their respective processors.

Figure 2:
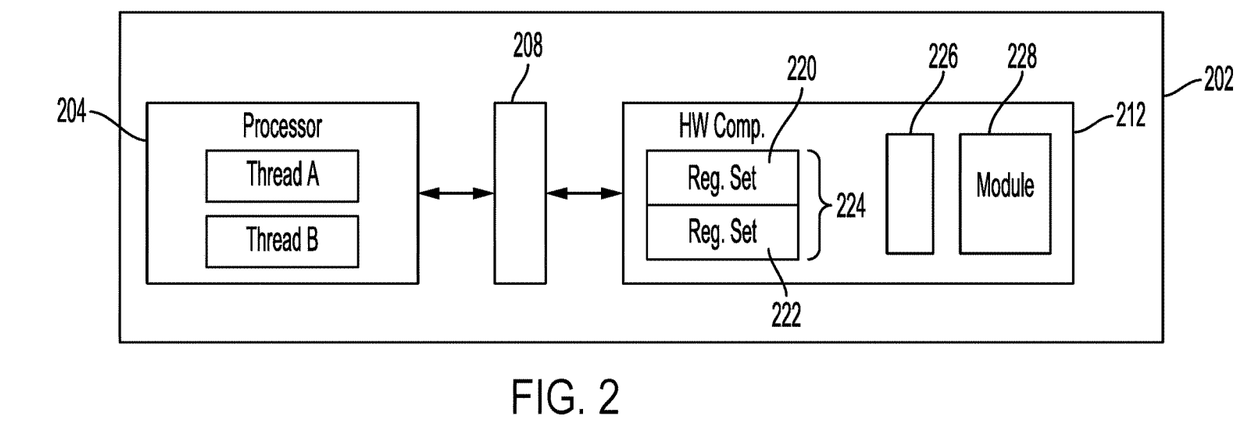
FIG. 2 illustrates an example of the virtualization of registers and the arbitration of a module in a hardware component according to an embodiment.

FIG. 2 illustrates an example of the virtualization of registers in a HW component and the arbitration of the use of a module of the HW component according to an embodiment. As shown in the example of controller 202 in FIG. 2, HW component 212 includes registers 224 comprised of register set 220 and register set 222. HW component 212 in the example of FIG. 2 also includes arbiter 226 and module 228. As discussed in more detail below, arbiter 226 can arbitrate between threads that have been allocated registers in HW block 212 for access to the functionality of module 228. In this regard, module 228 can implement a particular function of HW component 212, such as data error correction by buffering data read from storage (e.g., storage 116 in FIG. 1) and performing operations on the data to identify and correct any errors, such as with Error Correcting Code (ECC), for example. Other implementations can include a different functionality for module 228, such as, for example, formatting data for a particular communication protocol (e.g., Transmission Control Protocol (TCP)/Internet Protocol (IP)) or for a particular storage system platform (e.g., Memcached or Redis).

Processor 204 of controller 202 is configured to concurrently handle up to two threads, indicated as thread A and thread B in FIG. 2. HW component 212 may allocate a first portion of registers 224 to thread A by allocating register set 220 to thread A, and allocate a second portion of registers 224 to thread B by allocating register set 222 to thread B. When an instruction is received by HW component 212 via interconnect 208, HW component 212 can identify whether it is thread A or thread B that generated the instruction using a master ID value or thread identifier indicated by the instruction. If thread A generated the instruction, register set 220 is used, if needed for the instruction. On the other hand, if thread B generated the instruction, register set 222 is used, if needed for the instruction.

Arbiter 226 of HW component 212 arbitrates between thread A and thread B to select the next thread that will control module 228. In some implementations, arbiter 226 can prioritize performance of instructions out of order so that later received instructions of one thread are provided access to module 228 before earlier received instructions of another thread based on the identification of the threads using thread identifiers or master ID values. Such prioritization may be used, for example, to achieve a particular QoS for a particular thread or category of thread.

In the example of FIG. 2, each of thread A and B can operate without synchronization at processor 204 or knowledge of the other thread. Arbiter 226 can allow for both threads to concurrently use HW component 212 without incurring the additional processing time involved in conventional systems where a thread generating a later instruction for HW component 212 would have to wait until the full completion of an earlier instruction currently being handled by HW component 212. In this regard, only a few extra registers may be needed for instructions from each of threads A and B to be concurrently handled by HW component 212, as opposed to needing to dedicate a separate HW component including all of the components of HW component 212 for concurrent handling of instructions from threads A and B.

As discussed above, the identification of threads can allow for virtualization of the resources of a HW component so that multiple threads can share a resource, such as registers or a module of the HW component. As will be appreciated by those of ordinary skill in the art, other implementations may include the sharing of different resources than the registers and module shown in FIG. 2. For example, other implementations may involve sharing different resources such as ports in a communications HW component or processing units of an FPGA. Some implementations may therefore not include module 228 and/or arbiter 226 for arbitrating use of module 228.

Figure 3:
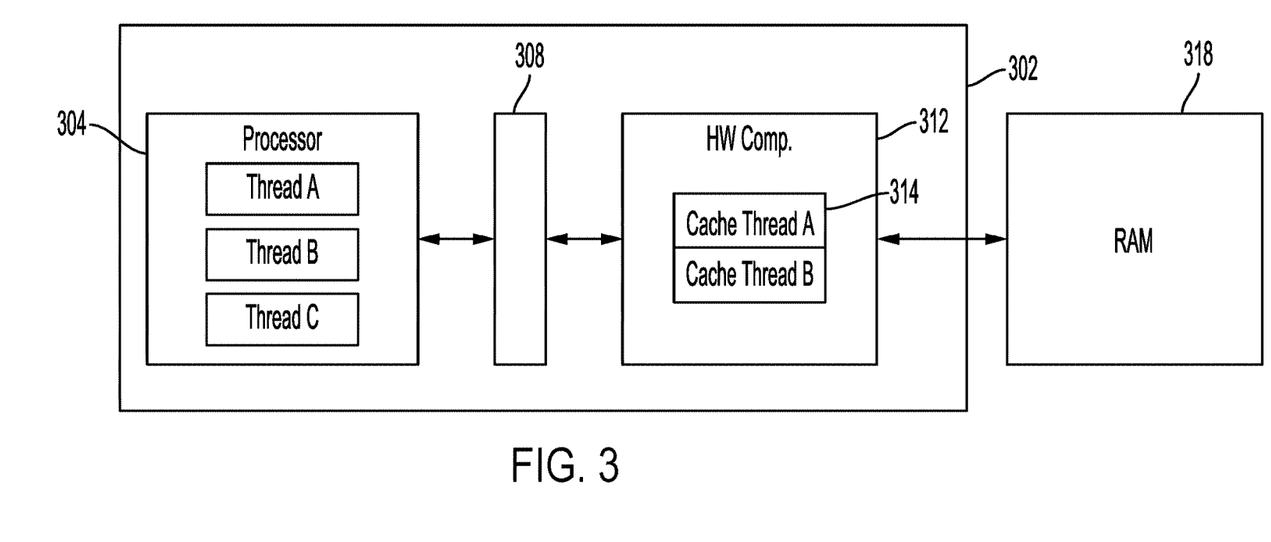
FIG. 3 illustrates an example of allocating a cache to threads according to an embodiment.

In this regard, FIG. 3 illustrates an example of allocating a cache to threads according to an embodiment. As shown in the example of FIG. 3, controller 302 includes processor 304 that is configured to concurrently handle up to three threads A, B, and C. HW component 312 is a memory controller for RAM 318, which is shown as being external to controller 302. HW component 312 includes cache 314, which may serve as a read cache for storing data frequently and/or recently accessed from RAM 318, or may serve as a write cache for storing data to be written to RAM 318.

As shown in FIG. 3, HW component 312 may allocate a certain portion or ratio of cache 314 for storing data for instructions generated by thread A, and allocate a remaining portion of cache 314 for storing data for instructions generated by thread B. In addition, HW component 312 may block thread C from accessing cache 314 by not allocating any of cache 314 to thread C. For example, thread C may always be assigned by processor 304 to a certain type or category of thread that should not have access to cache 314. As noted above, the partial or full blocking of certain types or categories of threads (e.g., the blocking of read access, write access, or both types of access) can serve as a security measure and/or protect system stability.

Example Processes

Figure 4:
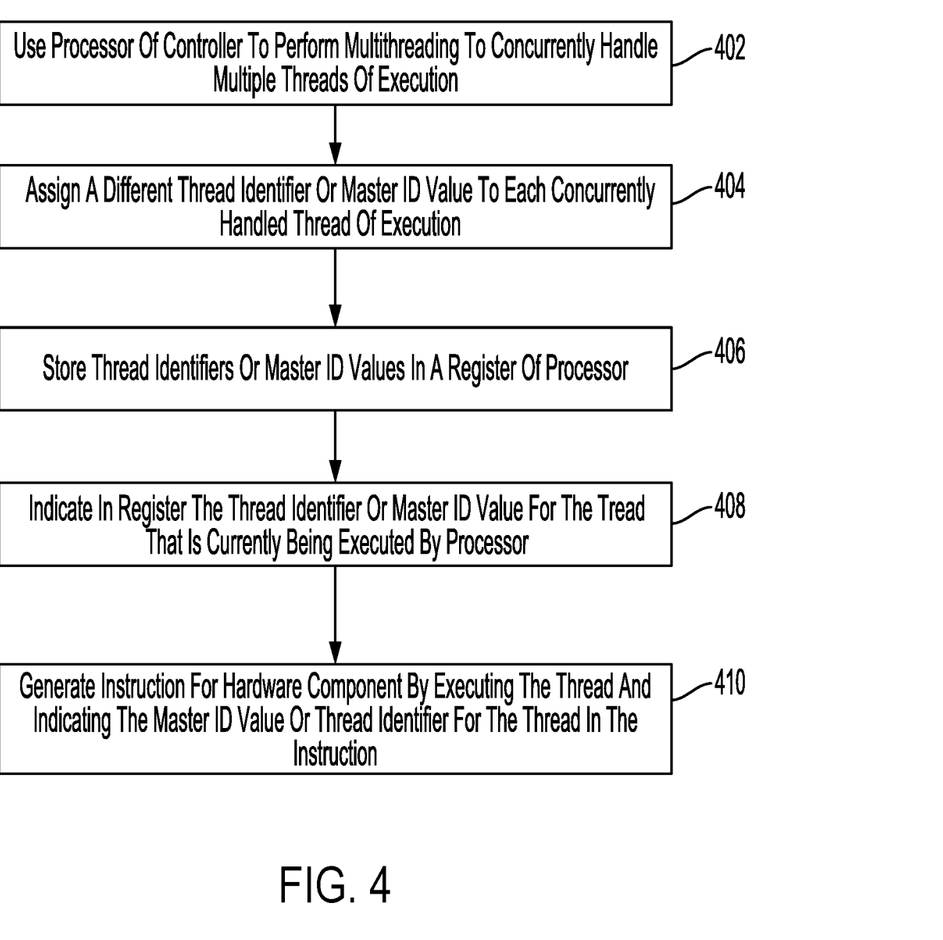
FIG. 4 is a flowchart for a thread-aware instruction process according to an embodiment.

FIG. 4 is a flowchart for a thread-aware instruction process according to an embodiment. The instruction process of FIG. 4 can be performed, for example, by a processor of a controller, such as processors 104 or 106 in FIG. 1.

In block 402, the processor is used to perform multithreading to concurrently handle multiple threads of execution. As noted above, multithreading can be used in multitasking operating systems, such as those used by DSDs to allow multiple firmware threads to exist within the context of one process. The threads can share the resources of the process, but are able to execute independently. Multithreading can also be applied to one process to enable parallel execution on a multiprocessing system.

In block 404, the processor assigns a different thread identifier or master ID value to each concurrently handled thread of execution. In some implementations, the processor may assign particular values to threads of different categories or from different types of programs. For example, threads associated with an FTL process may always be assigned a value of 1, threads associated with a FE process, exception handler, or interrupt routine may always be assigned a value of 2 or 3. A hardware component would then be able to identify instructions generated by threads associated with an FTL process based on an indication in the instruction of a thread identifier or master ID value of 1.

In block 406, the thread identifiers or master ID values assigned in block 404 are stored in a local register of the processor. The thread identifiers or master ID values may be stored in, for example, a master ID register of the processor (e.g., master ID register 105 or 107 in FIG. 1). In other implementations, the thread identifiers or master ID values may be stored in a memory outside of the processor, such as in memory 110 in the example of FIG. 1.

In block 408, the processor indicates in the register the thread identifier or master ID value for the thread that is currently being executed by the processor. As noted above, although the processor may concurrently handle multiple threads, only one thread is actually executed by the processor at a given time. The indication may include, for example, a particular value or flag in the local register for the thread being currently executed. When the processor switches to executing a different thread, the value or flag may be set to indicate execution of the different thread.

In block 410, an instruction is generated for a HW component of a controller by executing the thread. The instruction indicates the thread identifier or master ID value for the thread that is currently being executed by the processor and that generated the instruction. As discussed above, this can ordinarily allow the HW component to treat instructions from different threads differently to improve the efficiency, performance, and/or security of the controller. For example, the HW component may prioritize performance of the instruction generated in block 410 over the performance of another instruction generated by a different thread based on the master ID value or thread identifier indicated by the instruction.

Figure 5:
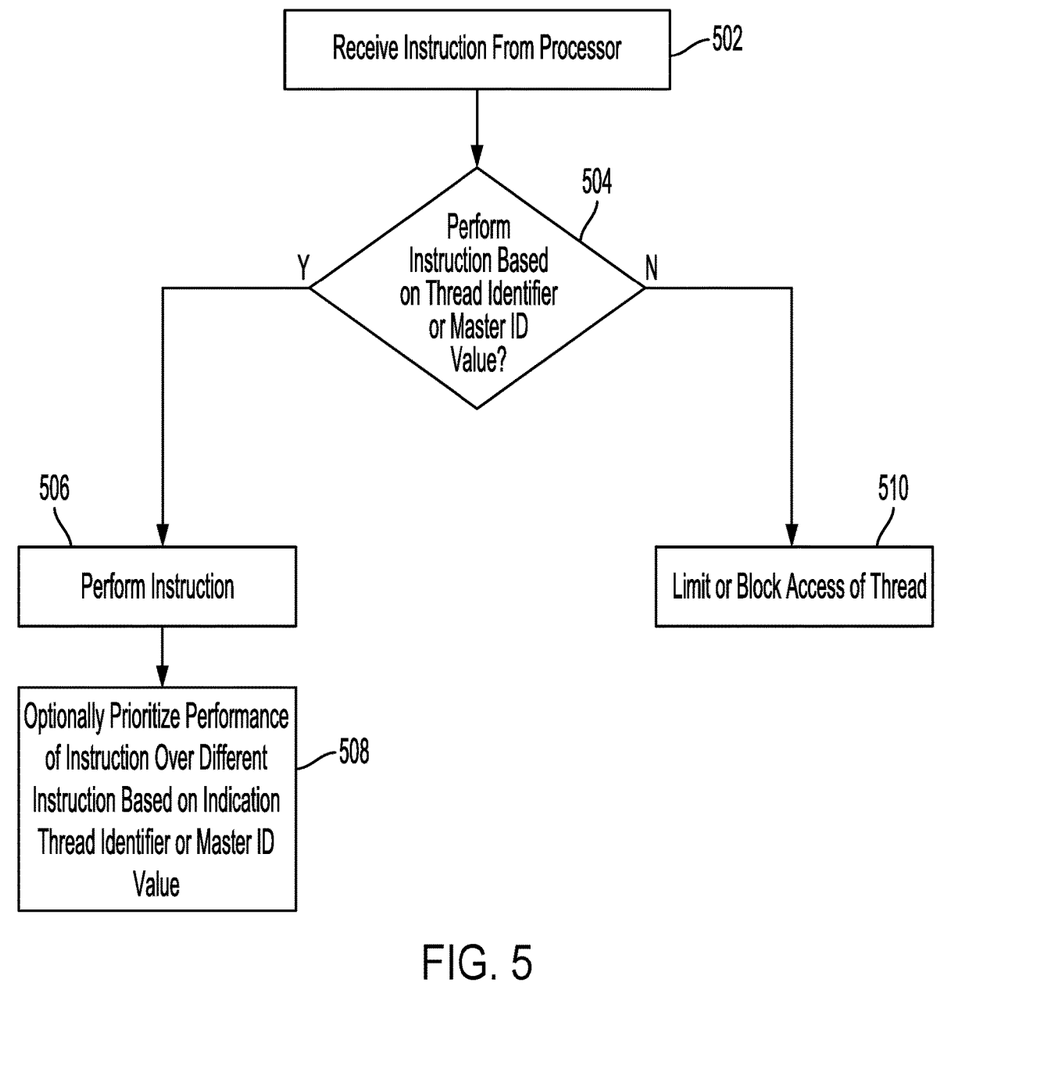
FIG. 5 is a flowchart for a hardware component access process according to an embodiment.

FIG. 5 is a flowchart for a HW component access process according to an embodiment. The process of FIG. 5 can be performed, for example, by a HW component of a controller, such as by HW component 112 or 114 in FIG. 1.

In block 502, the HW component receives an instruction from a processor. The instruction may include, for example, a read request to retrieve data from or via the HW component or a write request to store data in or via the HW component.

In block 504, the HW component determines whether to perform the instruction received from the processor based on a thread identifier or a master ID value indicated by the instruction. In some implementations, the HW component may access a list or other data structure of thread identifiers or master ID values that are not permitted to access the HW component. Alternatively, the HW component may access a list or other data structure of thread identifiers or master ID values that are permitted to access the HW component. Such a list or data structure may be stored locally at the HW component or at another location, such as in a local memory of the controller (e.g., memory 110 in the example of FIG. 1).

If it is determined in block 504 not to perform the instruction, the process ends with the hardware component in block 510 limiting or blocking access of the thread to the HW component or a resource of the hardware component, such as to registers, a processing unit, a module, a cache, or a port of the hardware component. The limiting or blocking of access can be partial, as in the case where certain threads or a category of threads may only have read access. In other cases, access to the HW component or resource of the HW component can be completely blocked, as in the case where certain threads or a category of threads are not allowed to read and write data in the HW component. In some implementations, a notification can be sent back to the processor that sent the instruction indicating that access to the HW component has been blocked for the thread or that the instruction is not permitted.

If it is determined in block 504 that the instruction should be performed, the HW component performs the instruction in block 506. As noted above, the instruction may optionally be prioritized over at least one other instruction based on the indication of the thread identifier or master ID value for the instruction.

Figure 6:
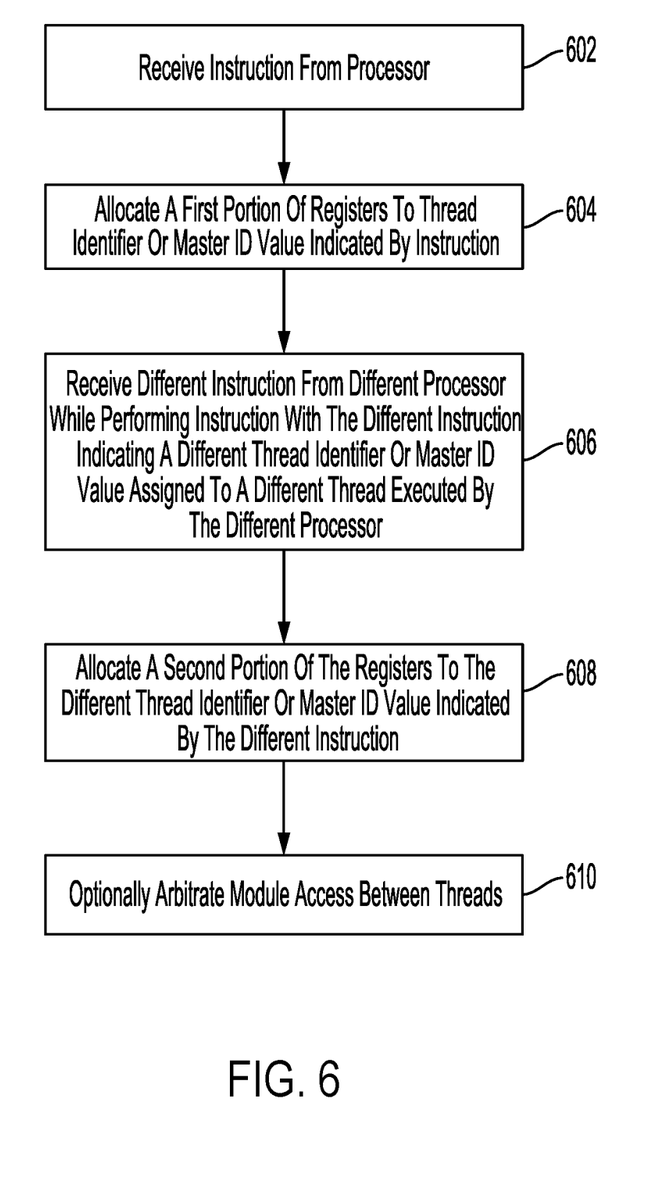
FIG. 6 is a flowchart for a register allocation process according to an embodiment.

FIG. 6 is a flowchart for a register allocation process according to an embodiment. The register allocation process of FIG. 6 can be performed by, for example, a HW component, such as by HW component 112 or 114 of FIG. 1.

In block 602, the hardware component receives an instruction from a processor. The instruction may include, for example, a read request to retrieve data from or via the HW component, or may include a write request to store data in or via the HW component.

In block 604, the hardware component allocates a first portion of registers to the thread identifier or master ID value indicated by the instruction received in block 602. In the example of FIG. 2 discussed above, this can include the allocation of register set 220 to thread A. In some implementations, the allocated registers may not form a predesignated set of registers, but rather, may include one or more registers of a set of registers.

In block 606, the hardware component receives a different instruction from a different processor while performing the instruction received in block 602. The different instruction indicates a different thread identifier or master ID value assigned to a different thread that is executed by the different processor. In this regard, the number of threads that can be concurrently handled by the processors of the controller are uniquely identified among the different processors, so that the HW component can distinguish among the different threads currently being executed by the different processors. As discussed above with reference to the example of FIG. 2, the allocation of registers to a particular thread can ordinarily allow for virtualization so that multiple threads can concurrently use the registers of the same HW component. In this regard, each thread can be unaware of the other thread or threads that are using the registers of the same HW component.

In block 608, the HW component allocates a second portion of the registers to the thread identifier or master ID value indicated by the different instruction received in block 606. As noted above for the allocation of registers in block 604, the allocated registers may or may not form a predesignated set of registers, and can include one or more registers of a predesignated set of registers.

In block 610, the HW component optionally arbitrates access of a module of the HW component between the different threads or instructions. As discussed above with reference to FIG. 2, the HW component may include a module for implementing a function of the hardware component, such as error correction or formatting data for a particular communications or storage protocol. The HW component in block 610, such as through an arbiter (e.g., arbiter 226 in FIG. 2), can select either the thread allocated the first portion of registers in block 604 or the different thread allocated the second portion of registers in block 608 as the next thread that will use the module. In some implementations, the HW component can prioritize performance of instructions out of order so that later received instructions of one thread are provided access to the module before earlier received instructions of another thread based on the identification of the threads using thread identifiers or master ID values. Such prioritization may be used, for example, to achieve a particular QoS for a particular thread or category of thread.

As discussed above, the use of thread identifiers or master ID values to identify threads or categories of threads can ordinarily improve the performance of a controller by prioritizing instructions generated by certain threads over others or by more intelligently allocating resources of a HW component. In addition, the use of thread identifiers or master ID values can also ordinarily improve the security or stability of the controller by blocking or limiting the types of access (e.g., read only access) to HW components or their resources by threads or categories of threads that should not have access to the HW component or its resources.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or control circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, and modules described in connection with the examples disclosed herein may be implemented or performed with a processor or control circuitry, such as, for example, a Central Processing Unit (CPU), a Microprocessor Unit (MPU), a Microcontroller Unit (MCU), or a DSP, and can include, for example, an FPGA, an ASIC, or other programmable logic device, discrete gate or transistor logic, discrete hardware components, or any combination thereof designed to perform the functions described herein. A processor or control circuitry may also be implemented as a combination of computing devices, e.g., a combination of a DSP and an MPU, a plurality of MPUs, one or more MPUs in conjunction with a DSP core, or any other such configuration. In some implementations, the control circuitry or processor may form at least part of an SoC.

The activities of a method or process described in connection with the examples disclosed herein may be embodied directly in hardware, in a software module executed by a processor or control circuitry, or in a combination of hardware and software. The steps of the method or algorithm may also be performed in an alternate order from those provided in the examples. A software module may reside in RAM memory, flash memory, ROM memory, EPROM memory, EEPROM memory, other types of solid state memory, registers, hard disk, removable media, optical media, or any other form of storage medium known in the art. An exemplary storage medium is coupled to a processor or a controller such that the processor or control circuitry can read information from, and write information to, the storage medium. In the alternative, the storage medium may be integral to the processor or the control circuitry.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive.

What is claimed is:

1. A controller, comprising:
   one or more hardware components for performing operations;
   an interconnect; and
   a plurality of processors connected to the one or more hardware components through the interconnect, wherein each processor of the plurality of processors is configured to:
   perform multithreading to concurrently handle multiple threads of execution;
   assign a different master ID value to each concurrently handled thread of execution;
   generate an instruction for a hardware component of the one or more hardware components by executing a thread of the concurrently handled threads of execution, wherein the instruction indicates the master ID value assigned to the thread; and
   send the generated instruction to the hardware component through the interconnect, wherein the hardware component is configured to block access to a resource of the hardware component by the thread based on the master ID value indicated by the instruction.

2. The controller of claim 1, wherein each processor of the plurality of processors includes a local master ID register for storing the master ID values assigned to the concurrently handled threads of execution.

3. The controller of claim 2, wherein each processor of the plurality of processors is further configured to indicate in the local master ID register the master ID value assigned to a thread that is currently being executed by the processor.

4. The controller of claim 1, wherein the plurality of processors includes at least one Reduced Instruction Set Computer (RISC) processor.

5. The controller of claim 1, wherein the concurrently handled threads of execution are firmware threads for controlling a data storage device.

6. The controller of claim 1, wherein the hardware component is further configured to determine whether to perform the instruction received from the processor based on the master ID value indicated by the instruction.

7. The controller of claim 1, wherein the hardware component includes a plurality of registers for storing data, and wherein the hardware component is further configured to:
  allocate a first portion of the plurality of registers to a first master ID value indicated by a first instruction received from the processor;
  receive a different instruction from a different processor of the plurality of processors while performing the first instruction, the different instruction indicating a different master ID value assigned to a different thread being executed by the different processor; and
  allocate a second portion of the plurality of registers to the different master ID value indicated by the different instruction received from the different processor.

8. The controller of claim 1, wherein the hardware component is further configured to prioritize performance of a first instruction over a different instruction based on the indication of the master ID value for the thread.

9. A data storage device comprising the controller of claim 1.

10. A method for operating a controller, the method comprising:
  using a processor of the controller to perform multithreading to concurrently handle multiple threads of execution;
  assigning a different thread identifier to each concurrently handled thread of execution;
  generating an instruction for a hardware component of the controller by executing a thread of the concurrently handled threads of execution, wherein the instruction indicates the thread identifier for the thread; and
  sending the generated instruction to the hardware component for performing the instruction, wherein the hardware component blocks access by the thread to a resource of the hardware component based on the thread identifier indicated by the instruction.

11. The method of claim 10, further comprising storing the thread identifiers assigned to the concurrently handled threads of execution in a register of the processor.

12. The method of claim 11, further comprising indicating in the register the thread identifier assigned to a thread that is currently being executed by the processor.

13. The method of claim 10, wherein the concurrently handled threads of execution are firmware threads for controlling a data storage device.

14. The method of claim 10, further comprising determining by the hardware component whether to perform the instruction received from the processor based on the thread identifier included in the instruction.

15. The method of claim 10, wherein the hardware component includes a plurality of registers for storing data, and wherein the method further comprises:
  allocating a first portion of the plurality of registers to a first thread identifier indicated by a first instruction;
  receiving a different instruction from a different processor of the controller while performing the first instruction, the different instruction indicating a different thread identifier assigned to a different thread being executed by the different processor; and
  allocating a second portion of the plurality of registers to the different thread identifier indicated by the different instruction received from the different processor.

16. The method of claim 10, further comprising prioritizing performance of a first instruction by the hardware component over a different instruction based on the indication of the thread identifier.

17. A non-transitory computer readable medium storing computer-executable instructions, wherein when the computer-executable instructions are executed by a controller, the computer-executable instructions cause the controller to:
  perform multithreading to concurrently handle multiple threads of execution at a processor of the controller;
  assign a different master ID value to each concurrently handled thread of execution at the processor;
  generate an instruction for a hardware component by executing a thread of the concurrently handled threads of execution, wherein the instruction indicates the master ID value assigned to the thread; and
  send the generated instruction to the hardware component, wherein the hardware component blocks access by the thread to a resource of the hardware component based on the master ID value indicated by the instruction.

18. The non-transitory computer readable medium of claim 17, wherein when the computer-executable instructions are executed by the controller, the computer-executable instructions further cause the hardware component to determine whether to perform the instruction based on the master ID value assigned to the thread.

* * * * *